United States Patent Office 3,425,860
Patented Feb. 4, 1969

3,425,860
PROCESS FOR COATING TIRE CORD
AND THE RESULTING PRODUCTS
Norman C. MacArthur, Avondale, Pa., assignor to Hercules Incorporated, Wilmington, Del., a corporation of Delaware
No Drawing. Continuation-in-part of application Ser. No. 475,232, July 27, 1965. This application Jan. 5, 1967, Ser. No. 607,401
U.S. Cl. 117—76  12 Claims
Int. Cl. B44d 1/14

ABSTRACT OF THE DISCLOSURE

Tire cord is produced from polyester, polyolefin, nylon or rayon cords by coating the surface of the cord with ethylenically unsaturated azidoformate monomers or polymers and particularly with the monoazidoformate of the triallyl ether of pentaerythritol, the monoazidoformate of 2-hydroxyethyl methacrylate and oleyl azidoformate. The azidoformate coated cords can be incorporated directly into rubber to be vulcanized or can be top coated with conventional tire cord adhesives and incorporated into the rubber.

---

This application is a continuation-in-part of my application Ser. No. 475,232 filed July 27, 1965 which is in turn a continuation-in-part of my application Ser. No. 417,469, filed Dec. 10, 1964, both of which applications are now abandoned, and of my application Ser. No. 596,053 filed Nov. 22, 1966, now U.S. Patent No. 3,369,030.

This invention relates to a process for producing tire cord and the product thereof; and more particularly to an improved process for coating tire cord to improve its adhesion to rubber, and to the coated tire cord.

In the past it has not been possible to use various synthetic fibers, as for example, polyester fibers, effectively as a reinforcing base in vulcanized rubber articles, due to poor adhesion between the fiber and the rubber itself. It has been found, for example, that tire cord failure and resultant tire blowout are probably caused by extreme strain on the cord resulting from local failure of adhesion between the cord and the surrounding rubber. Thus, although polyester cord has many potential advantages over the presently used rubber reinforcing materials, due to its higher initial modulus, its greater strength retention in humid environments and other improved properties, its use has not reached its full potential because of this adhesion problem. It will be appreciated that this problem of poor fiber-rubber adhesion is not limited to tire production, but is equally troublesome in other rubber reinforcing applications, such as, in hoses or reinforced rubber fabrics.

Now, in accordance with this invention, it has been found that tire cord and particularly polyester tire cord having good adhesion to vulcanized rubber can be prepared by coating the surface of the cord with an azidoformate material of the kind described hereinafter. This cord-to-rubber adhesion can be further improved for some usages if a second coating, superimposed upon the azidoformate coating, is applied to the cord surface. This second coating is a dispersion of a phenol-aldehyde condensation copolymer and a vinyl pyridine containing rubber polymer latex.

The synthetic fibers useful as tire cord in the instant invention include polyester, polyolefin, polyamide, polycarbonate and rayon fibers and particularly poly(ethylene terephthalate), polypropylene, poly(4-methylpentene-1), bis-phenol polycarbonate (prepared by condensing equal moles of bis-phenol and phosgene), nylon and rayon fibers. However, fibers made of filaments spun from blends of polymers, as for example from blends of polyester and other compatible polymers, such as nylon, etc., and fibers prepared from mixtures of filaments as for example mixtures of polyester filaments and other filaments, such as nylon, polypropylene or rayon filaments, can also be used.

Improved adhesion of synthetic fibers to rubber can be obtained by the process of this invention no matter what the physical form of these fibers. However, as a practical matter, the fibers so treated will generally have been previously woven or twisted into yarn or cord. Thus, this process is primarily useful in the treatment of tire cord. Various methods for the preparation of the tire cord and other woven or unwoven fiber substrates are well known to those skilled in the art.

The first step of the instant process is to apply a coating of an azidoformate material to the fiber base being treated. The azidoformates used for this coating step are compounds having the formula (1)
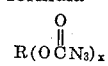

where R is an organic radical containing ethylenic unsaturation and x is an integer of from 1 through 5 and preferably from 1 through 3. The ethylenically unsaturated group contained in R preferably has at least one hydrogen atom attached to a carbon atom alpha to the ethylenic unsaturation. This unsaturated group can be a vinylidene group ($H_2C=C<$), such as occurs where R is vinyl, vinylalkyl (such as allyl, 3-butenyl, 4-pentenyl, 2-methyl-3-butenyl, 2-chloromethyl-3-butenyl, etc.), vinylcycloalkyl (such as 4-vinylcyclohexyl) or vinylaryl (for example, o-, m- and p-vinylphenyl and 2-vinylnaphthyl, and halo- or alkyl ring substituted derivatives thereof such as vinylchlorophenyl), and other vinylidene groups such as where R is methallyl, 2-ethylallyl, 3-methyl-3-butenyl, 2,3-dimethyl-3-butenyl, isopropenylphenyl, etc.; a vinylene group (—CH=CH—), such as where R is propenyl, 2-butenyl, 1-butenyl, 2-pentenyl, cyclohexenyl, dicyclopentadienyl, 2-phenylethenylene, and as found in the alkenyl fragments of such acids as oleic, linoleic, linolenic, licanic or eleostearic acids and the like; a substituted vinylene group of the formula —HC=C<, such as where R is 1-isobutenyl or 2-phenylpropenyl, etc.; a fully substituted vinylene group of the formula >C=C<, such as where R is 2,3-dimethyl-2-butenyl, 2,3-dimethyl-2-pentenyl, or 2,3-dimethyl-2-cyclohexenyl, etc.; or a radical of the formula $(R'O)_nZ$, where R' is R as defined above or is acrylyl or methacrylyl, Z is the inert residue of a saturated aliphatic alcohol having a minimum functionality of 2, and $n$ is the functionality of Z minus $x$ where $x$ is as defined above and $n$ is at least 1. Preferred alcohols from which Z can be derived include the dihydric alcohols such as ethylene glycol, trimethylene glycol, and hexamethylene glycol; trihydric alcohols such as glycerol and the trimethylol alkanes such as trimethylol propane; tetrahydric alcohols such as pentaerythritol; and the like.

Exemplary of the ethylenically unsaturated azidoformates of this invention are azidoformates having the formulae:

(1)
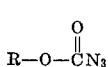

where R is an alkenyl, cycloalkenyl, alkenylaryl and alkenylcycloalkyl radical and contains 2 to 12 carbon atoms, as, for example, the monoazidoformate of allyl alcohol, the monoazidoformate of methallyl alcohol, oleyl azidoformate, linoleyl azidoformate, eleostearyl azidoformate, the monoazidoformate of o-, m-, and p-hydroxystyrene, the monoazidoformate of α-vinylbenzyl alcohol, the monoazidoformate of 4-vinylcyclohexanol, the monoazidoformate of cyclohexenyl alcohol, and the monoazidoformate of 2-vinyl-α-naphthol;

(2) 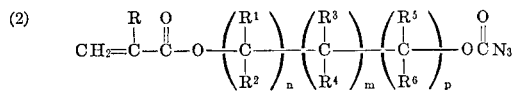

where R is hydrogen or methyl; $R^1$, $R^2$, $R^3$, $R^4$, $R^5$, and $R^6$ are each hydrogen or alkyl groups of 1 to 4 carbon atoms and may be alike or different; $n$, $m$, and $p$ are 0 to 6 and the sum of $n$, $m$, and $p$ is 2 to 6, as, for example, the monoazidoformate of 2-hydroxyethyl acrylate, the monoazidoformate of 3-hydroxy-n-propyl acrylate, the monoazidoformate of 2-hydroxy-n-propyl acrylate, the monoazidoformate of 4-hydroxybutyl acrylate, the monoazidoformate of 5-hydroxyamyl acrylate, the monoazidoformate of 6-hydroxyhexyl acrylate, the monoazidoformate of 2-hydroxyethyl methacrylate, the monoazidoformate of 3-hydroxy-n-propyl methacrylate, the monoazidoformate of 2-hydroxy-n-propyl methacrylate, the monoazidoformate of 4-hydroxybutyl methacrylate, the monoazidoformate of 5-hydroxyamyl methacrylate, and the monoazidoformate of 6-hydroxyhexyl methacrylate;

(3) 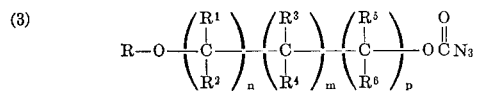

where R is an alkenyl radical containing 2 to 4 carbon atoms or an alkenoyl radical containing 2 to 18 carbon atoms; $R^1$, $R^2$, $R^3$, $R^4$, $R^5$, and $R^6$ are each hydrogen, alkyl (e.g., methyl and ethyl), methylol,

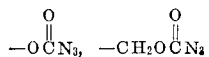

or —CH$_2$O—Y where Y is an alkanoyl or alkenoyl radical containing 3 to 18 carbon atoms; and $n$, $m$, and $p$ are 0 to 6 and the sum of $n$, $m$, and $p$ is 2 to 6; as, for example, the monoazidoformate of pentaerythritol dioleate, the bisazidoformate of pentaerythritol dioleate, the monoazidoformate of ethylene glycol monovinyl ether, the monoazidoformate of propylene glycol monovinyl ether, the monoazidoformate of butanediol monovinyl ether, the monoazidoformate of hexylene glycol monovinyl ether, the monoazidoformate of the allyl ether of ethylene glycol, the monoazidoformate of the allyl ether of 1,3-propylene glycol, the monoazidoformate of the monovinyl ether of 1,2-propylene glycol, the monoazidoformate of the allyl ether of 1,4-butanediol, the monoazidoformate of the monovinyl ether of 1,2-butanediol, the monoazidoformate of the monovinyl ether of 1,3-butanediol, the monoazidoformate of the monovinyl ether of 2,3-butanediol, the monoazidoformate of the allyl ether of hexylene glycol, the monoazidoformate of the allyl ether of glycerol, the monoazidoformate of the methallyl ether of ethylene glycol, the monoazidoformate of the monoallyl ether of trimethylol ethane, the monoazidoformate of the monoallyl ether of trimethylol propane, the monoazidoformate of the monoallyl ether of pentaerythritol, the monoazidoformate of the diallyl ether of glycerol, the monoazidoformate of the diallyl ether of trimethylol ethane, the monoazidoformate of the diallyl ether of trimethylol propane, the monoazidoformate of the diallyl ether of pentaerythritol, the monoazidoformate of the triallyl ether of pentaerythritol, the bisazidoformate of the diallyl ether of pentaerythritol, and the trisazidoformate of the allyl ether of pentaerythritol;

(4) 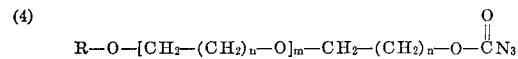

where R is an alkenyl radical containing 2 to 4 carbon atoms, $n$ is 1 to 2, and $m$ is at least 1, as, for example, the monoazidoformate of diethylene glycol monovinyl ether, the monoazidoformate of triethylene glycol monovinyl ether, and the monoazidoformates of other polyethylene glycol monovinyl ethers; and (5) Other azidoformates such as the monoazidoformate of 2-vinyl-5,5-bis(hydroxymethyl)-1,3-dioxane, the monoazidoformate of the allyl ether of butenediol, the trisazidoformate of dipentaerythritol tritungate, the trisazidoformate of the monoallyl ether of dipentaerythritol, the trisazidoformate of the diallyl ether of dipentaerythritol, the trisazidoformate of the triallyl ether of dipentaerythritol, the tetrakisazidoformate of the monoallyl ether of dipentaerythritol, the tetrakisazidoformate of the diallyl ether of dipentaerythritol, the pentakisazidoformate of the monoallyl ether of dipentaerythritol, the polyazidoformates of the vinyl or allyl ethers of mannitol, and the like.

The azidoformates used in the coating process of this invention can be prepared in various ways as, for example, by reacting a compound containing at least one ethylenic double bond, having at least one hydrogen on a carbon alpha thereto, and at least one reactive hydroxyl group, with phosgene, and then reacting the chloroformate resulting from that reaction with an excess (i.e., from about 1.05 moles to about 10 moles per equivalent of chloroformate) of an alkali azide. These reactions are illustrated by the following equations:

where R and $x$ are as defined above. Exemplary of compounds containing at least one ethylenic double bond with hydrogen alpha thereto and at least one reactive hydroxyl group, which can be used to form the azidoformates of this invention are allyl alcohol; hydroxyalkyl acrylates such as hydroxyethyl acrylate, hydroxypropyl acrylate and the like; hydroxyalkyl methacrylates such as hydroxyethyl methacrylate, hydroxypropyl methacrylate, and the like; alcohols derived from long chain unsaturated acids, such as, oleoyl alcohol, linoleoyl alcohol, and eleostearoyl alcohol, and the like; partial esters of unsaturated acids and polyols, such as pentaerythritol dioleate and the like, and alcohols derived from and partial esters of polyols with the mixtures of unsaturated fatty acids obtained from naturally occurring oils, such as tung oil, linseed oil, soybean oil, cottonseed oil and the like; the monovinyl ethers of glycols such as ethylene glycol monovinyl ether, propylene glycol monovinyl ether, butanediol monovinyl ether, diethylene glycol monovinyl ether and hexylene glycol monovinyl ether; the allyl ethers of glycols such as the allyl ether of ethylene glycol, the allyl ether of propylene glycol, the allyl ether of butanediol, the allyl ether of butenediol, and the allyl ether of hexylene glycol; the monoallyl ether of glycerine; the monoallyl ethers of trimethylolalkanes such as the monoallyl ether of trimethylolethane, the monoallyl ether of trimethylolpropane, the monoallyl ether of pentaerythritol; the monoacetals of acrolein and pentaerythritol such as 2-vinyl-5,5-bis(hydroxymethyl)-1,3-dioxane; the o-, m-, and p-hydroxystyrenes; ring substituted derivatives of the hydroxystyrenes; and the like. The diallyl ethers of trihydric alcohols, such as glycerine, trimethylolethane and trimethylolpropane, mixtures thereof with the corresponding monoallyl ethers and the di- and tri-allyl ethers of pentaerythritol, as well as mixtures thereof with each other and with the monoallyl ethers, are also suitable.

Before describing the invention in greater detail, the following examples are presented to illustrate the preparation of the azidoformates used in the instant process. All parts and percentages in these and all the other examples set forth herein are by weight unless otherwise indicated.

Example 1

To a slurry of 346 parts of phosgene, 140 parts of calcium carbonate and 668 parts of methylene chloride maintained at −10° C., are added dropwise over 45 minutes, 325 parts of 2-hydroxyethyl methacrylate, and the reaction mixture is agitated for 1.5 hours, at 0° C. Then the reaction mixture is sparged with nitrogen for 1 hour. The resulting chloroformate is aspirated under vacuum for 1 hour and then filtered while still cold. The solid product is washed with methylene chloride and the filtrate and washings are concentrated under vacuum to give 266 parts (55% yield) of chloroformate as a yellowish oil.

The above chloroformate dissolved in 1000 parts of methylene chloride is added dropwise, with agitation, to a slurry of 192 parts of sodium azide in 500 parts of water. The reaction mixture is agitated and maintained at room temperature for 45 hours. Then the methylene chloride layer is separated and washed several times with water to remove any water-soluble impurities, and dried over sodium sulfate. The azidoformate product is isolated by removing the methylene chloride under vacuum. The monoazidoformate of 2-hydroxethyl methacrylate, which is obtained as a straw-colored oil (240 parts; 87% yield based on the chloroformate), shows 100% of the theoretical amount of unsaturation present and 84% of the theoretical azidoformate groups present by infrared analysis.

Example 2

To a slurry of 223 parts of phosgene, 100 parts of calcium carbonate and 400 parts of methylene chloride, maintained at −10° C., are added dropwise over 1.5 hours, 384 parts of commercial triallyl ether of pentaerythritol, having an average degree of substitution greater than about 2.8. The reaction mixture is then agitated for an additional 3.5 hours. Subsequently, excess phosgene is sparged from the reaction mixture with nitrogen, the reaction mixture is filtered to remove salts, and the filtrate is aspirated under vacuum to remove the methylene chloride. The product is 446 parts (93% yield) of the chloroformate of triallyl ether of pentaerythritol, in the form of an oil.

A slurry of 216 parts of sodium azide in 400 parts of water is prepared, and 440 parts of the above chloroformate dissolved in 400 parts of methylene chloride is added thereto, with agitation. The reaction mixture, which is agitated vigorously, is maintained at room temperature for approximately 3 days and then refluxed for 5 hours. The methylene chloride layer is then separated, washed several times with water to remove any water-soluble impurities, and dried. The product, the monoazidoformate of the triallyl ether of pentaerythritol, is isolated as a deep yellow oil in 81% yield, the oil containing 0.383 grams of solid per cubic centimeter. Analysis for hydroxyl, terminal methylene, azide groups, total nitrogen and chlorine compares to theoretical as follows: Calculated for $C_{15}H_{23}O_5N_3$: OH, 0; $CH_2$, 12.9%; $N_3$, 12.9; nitrogen, 12.9; chlorine, 0. Found: OH, 0.2%; $CH_2$, 11.5; $N_3$, 11.1; nitrogen, 10.0; chlorine, nil.

Example 3

To a slurry of 0.4 mole of phosgene maintained at −10° C. are added dropwise over a period of 20 minutes, 0.2 mole of oleyl alcohol. This mixture is then stirred at 0° C. for an additional six hours. The reaction mixture is then sparged with nitrogen and placed under a reduced pressure to remove the excess phosgene. The resulting product is 66 parts of oleyl chloroformate, in the form of a clear oil.

A solution of 60 parts of the above oleyl chloroformate in 200 parts by volume of methylene chloride is stirred rapidly with a solution of 35.5 parts of sodium azide in 80 parts of water. This stirring is continued for five days at room temperature, and the organic layer is then separated, washed with water and dried over sodium sulfate. The resulting product is filtered, washed with methylene chloride, and yields 325 parts by volume of a solution of oleyl azidoformate. A portion of the solvent is removed, leaving the azidoformate in the form of a yellow oil. Analysis of the product for hydroxyl, nitrogen and unsaturation content is as follows:

Theoretical content of oleyl azidoformate: OH, 0%; N, 12.5%; —HC=CH—, 7.7%. Found: OH, <0.04%; N, 11.1%; —HC=CH—, 7.6%.

Example 4

A flask containing 84.2 parts of tung oil acids is flushed with carbon dioxide, and then arranged so that a slow stream of carbon dioxide gas moves continuously through the apparatus. The tung oil acids are then heated to a temperature of 200° C., with stirring, over a period of about one-half hour, and 25.4 parts of dipentaerythritol are added thereto slowly in the absence of air. A clear, amber solution results, which is held at 200° C. with stirring until its acid number is less than 5. This requires about 2-3 hours. The resulting product is a viscous liquid with an average of 3 hydroxyl groups per mole. This product is cooled to −10° C. and maintained at that temperature while 60 grams of phosgene is added thereto in small amounts over a period of 30–45 minutes. The temperature of the reaction mixture is then raised to 0° C. and the product is stirred for six hours, after which it is allowed to warm to room temperature. The excess phosgene is allowed to escape the reaction mixture during this warming. The resulting product is the chloroformate of dipentaerythritol tritungate. This chloroformate is dissolved in 300 parts by volume of methylene chloride and is then stirred with a solution of 38.4 parts of sodium azide in 90 parts of water for five days at room temperature. The organic layer is then separated, washed with water and dried over sodium sulfate. The resulting product analyzes on the average for the tris-azidoformate of dipentaerythritol tritungate.

Example 5

The general procedure of Example 1 is repeated except that in this example 132 parts of diethylene glycol monovinyl ether are added dropwise, with stirring, over a period of 1 hour to a slurry of 147 parts of phosgene, 55 parts of calcium carbonate, and 280 parts of methylene chloride, and 116 parts (60% yield) of the chloroformate is obtained as a yellowish oil. The above chloroformate, dissolved in 450 parts of methylene chloride, is next added dropwise with agitation to a slurry of 77 parts of sodium azide in 200 parts of water and the agitation continued for 24 hours at room temperature. The azidoformate product is then separated, dried, and isolated according to the procedure of Example 1. The monoazidoformate of diethylene glycol monovinyl ether which is obtained as a straw-colored oil (171 parts; 85% yield based on the chloroformate) is confirmed by an infrared spectrum which shows strong absorption at 2140 cm.$^{-1}$.

Since the azidoformates of this invention are monomers which contain ethylenic unsaturation, they can be converted into homopolymers and copolymers having molecular weights ranging from low to high by polymerizing the azidoformate monomer or a mixture of the azidoformate and at least one other ethylenically unsaturated monomer under conditions which do not destroy the azidoformate grouping, usually using conventional redox catalysts, such as cobalt-cyclohexanone peroxide or iron-benzoin-cumene hydroperoxide at room temperature, or such free radical initiators as acetyl peroxide, azobisisobutyronitrile, benzoyl peroxide, and the like, between room temperature and about 100° C. Thus, compounds containing at least one vinyl, vinylidene, or vinylene group ordinarily can be copolymerized with the azidoformate. Suitable monomers include, for example, olefins such as ethylene, trichloroethylene, 1,2-dichloropropene-2;

vinyl nitriles such as acrylonitrile and methacrylonitrile; vinyl esters such as vinyl acetate, vinyl carbazole, vinyl chloride, vinylidene chloride, allyl acetate, allyl chloride, allyl chloroacetate, methallyl acetate, methallyl chloride, isopropenyl acetate; diolefins such as butadiene and chloroprene; alkenylaryls such as styrene, the methylstyrenes, o-, m-, or p-chlorostyrene, 2,5-dichlorostyrene, pentachlorostyrene, m- or p-bromostyrene, p-iodostyrene, p-cyanostyrene, p-methoxystyrene, and p-dimethylaminostyrene; diethyl fumarate; diethyl maleate; maleic anhydride; the alkyl acrylates such as methyl acrylate and the higher alkyl esters, isobornyl acrylate; the α-chloroacrylates such as methyl α-chloroacrylate and the higher alkyl esters, β-chloroethyl acrylate; the methacrylates such as methyl methacrylate and the higher alkyl esters, isobornyl methacrylate; methyl vinyl ketone; 2-vinylpyridine; and the like, as well as an azidoformate of this invention which is different from the other azidoformate.

The following examples illustrate the polymerization of the azidoformate coating compositions of this invention, to produce polymers and copolymers which are themselves useful for coating fibers or cord to render them adherent to various rubbers. The molecular weight of the polymers is shown by the reduced specific viscosity (RSV), by which is meant the $\eta_{sp}/C$ determined on a 0.1% solution of the polymer in a given solvent at a given temperature.

Example 6

A solution of 5 parts of the monoazidoformate of the triallyl ether of pentaerythritol (prepared as in Example 2) in methylene chloride (18.9 parts by volume of solution) is stripped under reduced pressure on a rotary evaporator at about 50° C. for about 30 minutes. The residue is a clear, colorless, nonviscous liquid. The system is flushed with nitrogen, subjected to a reduced pressure of 6 inches of mercury, and the reaction mixture heated to 105–107° C. This heating is continued for 30 minutes, and the liquid product in the flask becomes a viscous polymer. The heat source is then removed and the flask and the product allowed to cool autogenously to a final temperature of 98° C. The product is then rapidly quenched with cold water. It is an extremely viscous oil, readily soluble in toluene.

Example 7

Solutions of the monoazidoformate of the triallyl ether of pentaerythritol (prepared as in Example 2) and hydroxyethyl methacrylate azidoformate (prepared as in Example 1), respectively, each containing 2.5 parts of solids, are mixed. The solvents are stripped from this mixture under a reduced pressure at a temperature of 50° C., using a rotary evaporator, in the same manner as that described in Example 5. The liquid product is flushed with nitrogen, and subjected to a reduced pressure of about 6 inches of mercury. The product is then heated under the reduced pressure to a temperature of about 105–107° C., and held at that temperature for about 45 minutes. The product then begins to increase in viscosity. The polymerization of the product at a temperature of 105–107° C. is continued until the product barely flows. The product is then removed from the heat and rapidly quenched in cold water. The resulting product is a very viscous copolymer, soluble in toluene.

Example 8

A polymerization tube was charged with 25 parts of an ethylene dichloride solution containing 2.45 parts of the azidoformate of 2-hydroxyethyl methacrylate prepared in Example 1 and 0.12 part of benzoyl peroxide. The tube was capped, and then was evacuated and filled 3 times with nitrogen. Hypodermic needles were inserted into the tube so that a stream of nitrogen could be passed into and out of the tube continuously. The tube and contents were then heated to 70° C. and held there with agitation for 3 hours, after which the solution was permitted to cool to room temperature overnight. The cooled solution was added dropwise to 8 to 10 volumes of stirred hexane to precipitate the polymer and the polymer was collected and dried for 3 hours in vacuo at 30° C. The polymeric monoazidoformate of 2-hydroxyethyl methacrylate was recovered in 51% conversion, had an RSV of 0.14 as determined in ethylene dichloride at 25° C., and on analysis contained 18.88% nitrogen (calculated for $C_7H_9O_4N_3$, 20.6%) after correction for purity of the monomer.

Example 9

Into a reaction vessel charged with

| | Parts by weight |
|---|---|
| α-Methylstyrene | 78 |
| Ethyl acrylate | 21 |
| Azidoformate of 2-hydroxyethyl methacrylate prepared in Example 1 (dissolved in methylene dichloride) | 5 |
| Water | 200 |
| Sodium lauryl sulfate | 6 |
| $FeSO_4 \cdot 7H_2O$ | 0.020 |
| Sodium ethylenediamine tetraacetate | 0.029 |
| Sodium formaldehyde sulfoxylate | 0.36 |
| Tert-dodecyl mercaptan | 0.1 | and flushed 3 times with nitrogen, there was injected 0.13 part by volume of a 56% solution of p-menthane hydroperoxide. The mixture was agitated at 25° C. for 3 hours under nitrogen, and then was shortstopped by adding 9 parts of a 3% solution of 2,5-di-tert-amylhydroquinone in benzene. The polymeric latex was coagulated by adding it dropwise to 10 volumes of methanol, and then the coagulum was collected and was dissolved in sufficient toluene to give approximately 10% solids. The solution was filtered and the filtrate was added dropwise to 10 volumes of stirred methanol to reprecipitate the polymer. The product was collected and air-dried for 72 hours, giving a terpolymer of α-methylstyrene, ethyl acrylate, and the azidoformate of 2-hydroxyethyl methacrylate which weighed 31 grams, contained 1.2% nitrogen, and had an RSV of 1.2 determined in ethylene dichloride at 25° C.

Example 10

A polymerization tube was charged with 10 parts of butyl methacrylate, 0.5 part of the azidoformate of the triallyl ether of pentaerythritol prepared in Example 2 (dissolved in 1.6 parts of ethylene dichloride), 20 parts of benzene and 0.03 part of α,α'-azobis(isobutyronitrile). A magnetic stirring bar was inserted into the tube and the tube was closed and was flushed 3 times with nitrogen. The charge was then heated, with stirring, and maintained at 65° C. for 4 hours. Total solids determination based on the cooled solution indicated 50% conversion to copolymer. The isolated product, a copolymer of butyl methacrylate, and the azidoformate of the triallyl ether of pentaerythritol, had an RSV of 0.3 determined in ethylene dichloride at 25° C. and contained 0.3% nitrogen.

The azidoformate coating composition is applied, preferably, uniformly to the surface of the fiber or cord to be coated by conventional means, for example, by dipping, spraying, brushing, or running the cord over a coated roll with a dispersion or solution of the azidoformate in a suitable diluent. Any inert organic diluent can be used. Exemplary of suitable organic solvents are toluene, xylene, chlorobenzene, methyl ethyl ketone, ethylenedichloride and butylacetate. Water can also be used as the diluent for the azidoformate, with the coating being applied as an aqueous suspension, emulsion or dispersion, etc. In such case a surface active agent is included in the water-azidoformate mixture. Generally, running the cord over a coated roll or dipping the cord in the azidoformate—diluent dispersion is the most convenient mode of application. However, other modes of application can also be used, as will be readily apparent to those skilled in the art. After the azidoformate is applied to the cord, the coated cord is heated to a temperature above the decomposition point of the azidoformate, resulting in modification of the cord at the azidoformate—cord interfaces. The decomposition temperature of the azidoformate, to which the azidoformate coated cords are heated, varies over a wide range. However, this temperature which is termed the "curing temperature" is generally from about 70° C. to about 350° C. This heating or curing need be carried out only for a relatively short period of time. However, the curing time must be sufficient to allow the desired degree of interaction between the azidoformate and the surface of the cord to occur. Generally, curing times in the order of about several seconds to one hour produce satisfactory results, although longer curing times can, of course, be used.

Thus, after the azidoformate dispersion has been brought into uniform contact with the cord, the coated cords can be heated directly to a temperature above the decomposition point of the azidoformate in order to produce the above-described interfacial activity and the resulting modification of the cord surface. Alternatively, the curing step, i.e., the heating of the coated cord to a temperature in excess of the decomposition temperature of the azidoformate, can be deferred until the azidoformate-coated cord has been embedded in the rubber, if desired. In such case, the azidoformate can be air dried at room temperature or other low temperatures, and the interaction between the azidoformate and the cord surface effected during vulcanization. This alternative procedure is preferably used only with the higher molecular weight azidoformates, such as those which have been bodied or polymerized to higher molecular weights, as illustrated in the following examples, because these higher molecular weight compositions have less of a tendency to diffuse away from the cord prior to vulcanization and curing.

Various amounts of the azidoformate coating material can be used, the optimum amount depending upon the amount of modification of the cord desired, the specific azidoformate used, etc. In general, the amount added, based on the weight of the cord, will be about 0.1% to about 10%, preferably about 0.5% to about 5%.

Following the application of the azidoformate to the cord surface, and the subsequent drying or curing of that coated surface, one of two procedures can be followed.

In accordance with the first procedure, the modified cord is incorporated directly into the rubber stock to be reinforced, and the stock containing the embedded modified cord is vulcanized. This vulcanization can be with conventional vulcanizing agents such as sulfur, dicumyl peroxide and by other equivalent processes well known to those skilled in the art. Conventional vulcanization temperatures on the order of about 275° F. to 350° F. can be used, provided that if there has been no prior curing of the azidoformate coating, the vulcanization temperature used must be above the decomposition temperature of the particular azidoformate composition which is used. The adhesion between the rubber and the cord in the resulting vulcanized product is greatly improved over that which can be achieved using unmodified cord.

While applicant does not wish to be held to any particular theory of his invention, it is believed that the azidoformate coating is bonded to the cord by a nitrene insertion reaction between the azidoformate and the polymer of the cord, while the modified cord and the rubber are adhered by sulfur vulcanization, and possibly also by nitrene addition and nitrene insertion reactions.

This direct vulcanization of rubber with the modified cord is illustrated by the following specific examples.

Examples 11–14

Samples of poly(ethylene terephthalate) tire cord are immersed for 5 minutes in a 20% methylene dichloride solution of the azidoformate of the triallyl ether of pentaerythritol prepared in Example 2, excess solution is drained from the cord and the samples are dried under the following conditions.

| Example No. | Coating, percent (azidoformate add-on) | Drying conditions |
|---|---|---|
| 11 | 15.8 | Air-dried. |
| 12 | 18.4 | Do. |
| 13 | 20.1 | 45 min. at 155° C. |
| 14 | 16.7 | Do. |

Each of the samples is then embedded in styrene—butadiene rubber stock and the rubber vulcanized for 30 minutes at 155° C. The degree of adhesion of the treated cord to the rubber stock is evaluated by pulling the cord from the vulcanized stock and observing the type of adhesive failure. The cords of Examples 11 to 14 are covered with rubber to the extent of at least 25%, indicating a significant amount of failure of the rubber-to-rubber bonds as compared with rubber-to-cord bonds. Poly(ethylene terephthalate) cord which has not been treated with the azidoformate is similarly incorporated in the rubber stock and vulcanized. The cord, after pulling from the vulcanized stock, has less than 10% rubber on its surface. These results indicate that the azidoformates improve the adhesion of rubber to poly(ethylene terephthalate) tire cord.

Example 15

An 840 denier, two-ply twisted polyester tire cord made of poly(ethylene terephthalate) is coated with a 3% by weight solution of the azidoformate of the triallyl ether of pentaerythritol (prepared as in Example 2) in toluene. The coating is effected by passing the cord, at 150 grams of tension, under two grooved stainless steel wheels, the lower portions of which rotate in the treating solution. The residence time of the cord in the azidoformate solution is 2 to 8 seconds. While still under tension, the cord is dried at room temperature for a few minutes and then at 350° F. for one minute. The weight of the cured coating is 0.5% by weight of the cord. This coated cord is then pressed into the surface of an uncured bar of a styrene—butadiene—natural rubber body stock and vulcanized for 45 minutes at 307° F. and 2000 p.s.i.g. by means of dicumyl peroxide initiation. The vulcanized rubber containing the coated tire cord is removed from the mold and allowed to stand at room temperature for 24 hours. The cord is then pulled from the vulcanized rubber bar, and its underside examined for indications of rubber-rubber vs. rubber-adhesive failure. In comparison to a control sample, treated in the same manner except that it is not coated with the azidoformate, the cord which has been coated with the azidoformate material contains 2 to 3 times as much rubber.

Example 16

The procedure of Example 15 is duplicated, except that the azidoformate used is the polymerized azidoformate of the triallyl ether of pentaerythritol, prepared in Example 6, in the form of a 3% solution in toluene. The azidoformate-treated cord again contains 2 to 3 times as much rubber as the untreated control sample of cord.

Example 17

The procedure of Example 15 is repeated again except that the azidoformate material used is the monoazidoformate of 2-hydroxyethyl methacrylate, prepared as in Example 1, in the form of a 3% solution in toluene. The results obtained are similar to those of Examples 15 and 16, with much more rubber adhering to the azidoformate-treated cord than adheres to the untreated control.

Example 18

The procedure of Example 15 is duplicated in this example except that the azidoformate used is tris-azidoformate of dipentaerythritol tritungate, prepared as described in Example 4. When the cords are pulled from the rubber bars at least twice as much rubber adheres to the azidoformate-treated cord as adheres to the untreated control cord.

Example 19

The procedure of Example 15 is again repeated, except that in this example the azidoformate used is the oleyl azidoformate prepared in Example 3 in the form of a 3% solution in toluene. When the azidoformate-treated poly (ethylene terephthalate) tire cord is pulled from the vulcanized rubber bar, large amounts of rubber adhere to the cord, showing much rubber to rubber failure as distinguished from rubber to adhesive or cord failure. A control cord is treated in the same manner except that it is not coated with azidoformate. This control retains only small amounts of rubber, indicating a far lesser degree of rubber to cord adhesion.

Example 20

The procedure of Example 15 is duplicated in this example except that in this example the rubber body stock used is an ethylene-propylene copolymer rubber. The vulcanization of this rubber is carried out by dicumyl peroxide initiation, for 45 minutes at 320° F. A comparison of the azidoformate-treated cord pulled from this rubber bar with a control cord treated in the same manner except that it is not coated with azidoformate material indicates that a two to three fold increase in the area of the cord covered with rubber occurs when the azidoformate treatment is used. Further, the rubber adhering to the azidoformate-treated cord is in much larger pieces.

Example 21

The procedure of Example 20 is duplicated except that the rubber used is a polybutadiene—polyisoprene blend (1 to 1). The rubber bar containing the polyester cord is cured for 45 minutes at 307° F. using sulfur. Again a two to three fold increase in the area of the cord covered with rubber results from the azidoformate treatment.

Example 22

An aqueous emulsion of the monoazidoformate of the triallyl ether of pentaerythritol is prepared by adding 600 parts of the azidoformate prepared in Example 2, and 6 parts of an anionic surface active agent (Alipal CO 436, General Aniline & Film Corp.—a 58% solution of an ammonium salt of a sulfate ester of an alkyl phenoxy poly (ethyleneoxy) ethanol) to 19,400 parts of water in a blendor, with vigorous stirring. This addition is carried out over a period of five minutes, and the blending is continued for an additional five minutes after the addition is completed. A stable, white emulsion of the azidoformate results.

A section of poly(ethylene terephthalate) tire cord, under 50 grams of tension, is coated with the azidoformate emulsion by passing it under two grooved stainless steel wheels whose lower portions rotate in the azidoformate emulsion. Residence time of the cord in the emulsion is 2-8 seconds. The cord is dried, while still under tension, for about one minute at 300-350° F. The add-on of azidoformate cured coating is equal to 0.2-0.8% by weight of the cord. The azidoformate coated cord is embedded in a bar of an ethylene—propylene—diene terpolymer rubber (Nordell-1040, produced by Du Pont) and the rubber bar is vulcanized for one hour at 320° F. and 2000 p.s.i.g. ram pressure, by means of dicumyl peroxide initiation. After aging overnight, the cord is pulled from the rubber surface and compared to a control cord which is treated in exactly the same manner except that it is not coated with azidoformate. The azidoformate-treated cord has 4 to 5 times as much retained rubber as the control cord.

Examples 23–24

Six-foot samples of nylon cord (Example 23) and rayon cord (Example 24) are cleaned with detergent and solvent to present a chemically clean surface and are attached to a coating line and run first through a dip tank containing a 5% (by volume) methyl chloroform solution of the azidoformate of the triallyl ether of pentaerythritol prepared in Example 2 at 30 ft./min. under a tension of 95–100 grams, next through a forced draft oven at 400° F. where the treated cord is heated for about 54 seconds, and finally to a packaging unit. Ten-inch test pieces of the azidoformate coated cords are then pressed into rubber stock, vulcanized and evaluated according to the method of Example 15. In comparison with a control sample, treated in the same manner except that it is not coated with the azidoformate, the cord of Example 23 has a number of good-sized pieces of rubber on its surface, whereas the control does not, and the cord of Example 24 has heavy pieces of rubber along its periphery and a number of broken filaments whereas the control has less rubber and only a few broken filaments.

Rather than incorporating the azidoformate-modified cord directly into the rubber to be vulcanized, it may be desirable to follow an alternative procedure involving the application of a second coating material to the modified cord surface. This second coating which can be applied immediately after drying the modified cord or at some later time, if desired, is a latex which is compatible with the rubber in which the cord is embedded, and is generally a conventional tire cord adhesive comprising a mixture of a phenol-aldehyde resin and a rubber terpolymer latex prepared from a vinyl aryl monomer—a diene monomer and a vinyl pyridine-type monomer. Preparation of the preferred form of this second coating material will be illustrated by the following example.

Example 25

To a solution of 0.15 part of sodium hydroxide in 119 parts of water is added 5.5 parts of resorcinol with continued stirring until a complete solution is achieved. Then 8.1 parts of 37% formaldehyde is added. The solution is aged for 6 hours at about 25° C., and the resulting solution is added slowly to a mixture of 30 parts water and 122 parts of a 20% solids latex of a styrene—butadiene—vinyl pyridine terpolymer (about 15:70:15, respectively). The mixture is stirred slowly for 15 minutes and its pH adjusted to 10.3 using concentrated ammonium hydroxide. The resulting gray-violet, opaque product is preferably aged for from several hours to about one day at room temperature before it is used. This aging is preferably carried out in the absence of air.

The amounts of the various ingredients used, the temperatures, times and other process variables used in Example 25 can be varied widely in producing the second coating material for the cord. Thus, the mole ratio of phenolic compound to aldehyde can be varied between about 1 to 2 and about 1 to 10; the vinyl pyridine content of the rubber terpolymer can be from about 5% to about 25%, preferably about 10% to about 20%, the styrene content about 5% to about 35%, preferably about 15% to about 30%, and the butadiene content about 50% to about 85%, preferably about 60% to about 70%; the ratio of rubber polymer latex to the phenol-aldehyde resin can be between about 2 to 1 and about 10 to 1; the aging can be carried out at room temperature or elevated temperatures; and the pH need only be adjusted to about 9.5 to 10.5. The rubber polymer used in the second coating composition generally will be a terpolymer of a vinyl aryl monomer, a diene monomer and a vinyl pyridine-type monomer. The vinyl aryl monomer will preferably be styrene, although other monomers, such as, vinyl toluene, etc. can also be used. The diene monomers which can be used in preparing the second coating composition are open chain conjugated diolefins, including, for example, butadiene-1,3, isoprene, 2,3-dimethylbutadiene-1,3; 1,2-diethylbutadiene-1,3; and piperylene. The vinyl pyridine-type monomers comprehended by this invention include alpha, beta, and gamma vinyl pyridines and their homologs, such as, for example, alpha-vinyl pyridine, 5-ethyl-2-vinylpyridine, 2 - methyl-5-vinylpyridine, 5-butyl-2-vinylpyridine, 5-heptyl-2-vinylpyridine, 6-methyl-2-vinylpyridine, 4,6 - dimethyl-2-vinylpyridine, 2-methyl-4-vinylpyridine, etc. Alpha-vinyl pyridine, 2-methyl-5-vinylpyridine, and 5-ethyl-2-vinylpyridine are preferred.

The phenol-aldehyde resin is preferably prepared from resorcinol and formaldehyde, although other phenols such as phenol, p-cresol and pyrogallol can also be used in similar amounts.

The second coating is applied, preferably uniformly, to the azidoformate-modified cords by dipping, spraying, running the cord over a coated roll, or other conventional procedures. The amount of this coating added will be about 1% to about 15% by weight of the cord. The coated cords are then cured for a short time (on the order of about 1 to about 10 minutes) at a temperature between about 250° F. and about 425° F., preferably between about 300° F. and about 400° F. The resulting cured second coating is a hard, rigid polymer which is very adherent to the modified cord and produces excellent adhesion between the modified and coated cord and conventionally vulcanized rubber in which the treated cord has been embedded. Again, the cure may be deferred and carried out concurrently with the vulcanization of the rubber in which the cord has been embedded.

It is believed that the adhesion between the azidoformate modified cord and the second coating is a result of either dispersion forces or chemical bond, such as that resulting from a reaction of the second coating with carboxyl or imine groups on the cord, or nitrene insertion and addition, or a combination of both.

The rubber compositions in which the coated cord can be used as a reinforcing medium include natural rubber, and synthetic rubbers, such as, styrene—butadiene rubber, ethylene—propylenediene terpolymer rubbers, wherein suitable -diene termonomers include, for example, dicyclopentadiene, butadiene, isoprene, norbornene, 5-methyl-2-norbornene, 1,4-hexadiene, 6-methyl-1,5-heptadiene, and the like, ethylene—propylene copolymer rubbers, polybutadiene, polyisoprene, and mixtures and blends thereof. It will be appreciated that the most important application of this invention is in tire cord treatment.

The following examples will further illustrate the preparation of the instant modified cords by first coating with the azidoformate coating compositions and then applying a second coating of the conventional phenol-aldehyde resin-vinyl pyridine terpolymer rubber latex.

Examples 26–30

Five samples of poly(ethylene terephthalate) tire cord, 840 denier and two ply, are cleaned with detergent and organic solvent, to present a chemically clean surface. The samples are passed through a 2.5% solution in toluene of the azidoformate of the triallyl ether of pentaerythritol, prepared as in Example 2. The azidoformate coated cords are dried in the manner described below, and the add-on weight (as percent of cord weight) of the azidoformate in each sample is calculated to be the amounts shown.

| Example No. | Drying conditions | Add-on weight of azidoformate, percent |
|---|---|---|
| 26 | Cure 30 minutes at 150° C. under nitrogen | 0.2 |
| 27 | Cure 30 minutes at 150° C. under air-forced draft. | 0.2 |
| 28 | Cure 30 minutes at 150° C. under air-no draft | 0.4 |
| 29 | Air-dry for one hour at 22° C | 1.0 |
| 30 | Control-no treatment of cord | |

Each of the five cords is then separately heated at about 175–180° C. for two minutes and dipped in the resin—latex mixture prepared in Example 25 for about five seconds. The excess resin—latex coating is wiped off, and each cord is baked for five minutes at about 175° C. in a forced draft oven under only nominal tension. Microscopic examination shows the cords to be evenly coated, and they exhibit a reddish-brown color. The add-on weight of resin—latex (based on the weight of the cord) is calculated to be as follows.

| Example No.: | Add-On weight, percent |
|---|---|
| 26 | 7.7 |
| 27 | 7.5 |
| 28 | 8.8 |
| 29 | 9.4 |
| 30 | 11.0 |

Pieces are cut from each cord and press-cured in ½ x ¼ x 6 inch molds with an 80% natural rubber and 20% styrene—butadiene blend body stock for 45 minutes at 153° C. and 2000 p.s.i.g. The tests are removed from the mold and cooled for about one hour. The adhesion between the coated cord and the vulcanized rubber is evaluated by pulling the cords out of the rubber by hand.

The cords of Examples 26–29 pull out one to two inches with difficulty and cannot be removed further by hand. The cords are completely covered with rubber, and the pulling causes rubber-to-rubber failure rather than cord-to-rubber failure as large sections of rubber stay with the portion of the cord pulled out.

The cord of Example 30 can be removed completely from the rubber by hand. It has only slight resistance to pull and only about one-half of its surface is covered with rubber. On pulling, large amounts of the resin—latex second coating are left behind on the rubber, indicating failure of cord-to-coating adhesion.

Example 31

An 840 denier, two-ply polyester tire cord made of poly(ethylene terephthalate) is coated with the azidoformate of the triallyl ether of pentaerythritol in the manner described in Example 15. The azidoformate-coated cord is dried for about one hour at room temperature and then is heated at 350° F. for one minute and dipped slack in the resorcinol-formaldehyde resin—terpolymer latex prepared in Example 25. The cord is removed from the dip and sponged to remove excess resin—latex mixture. It is then baked for 5 minutes at 350° F. while being held at 50 grams tension. This results in a cord which is evenly coated with a reddish-brown coating. The amount of the coating on the cord is about 6% by weight of the cord. The coated cord is then vulcanized for 45 minutes at 307° F. and 2000 lbs. ram pressure in a sulfur cured styrene-butadiene—natural rubber body stock. The rubber containing the coated cord is aged for 24 hours at room temperature after it is removed from the vulcanizing mold. The cord cannot be removed from the vulcanized rubber test piece without doing substantial damage to the rubber bar or breaking the cord.

Example 32

The procedure of Example 31 is duplicated except that the azidoformate used is the polymerized azidoformate of the triallyl ether of pentaerythritol prepared in Example 6. When the azidoformate-treated cord is pulled from the vulcanized rubber bar large folds of rubber adhere to a substantial portion of the cord.

Example 33

The procedure in Example 31 is repeated except that the azidoformate used is the copolymer of the azidoformate of the triallyl ether of pentaerythritol and the azidoformate of hydroxyethyl methacrylate, prepared in Example 7. When the cord is pulled from the vulcanized body stock large folds of rubber adhere to a large portion of its surface.

Example 34

The procedure of Example 31 is again duplicated, except that the azidoformate used is oleyl azidoformate, prepared as in Example 3. The large pieces of rubber which adhere to the treated cord when it is pulled from the vulcanized rubber bar indicate very good rubber to coated cord adhesion, and substantially greater rubber to rubber failure than rubber to cord failure.

Example 35

In this example the procedure of Example 31 is again duplicated, except that here the azidoformate used is the trisazidoformate of dipentaerythritol tritungate, prepared as in Example 4. The treated cord is again embedded in a styrene-butadiene—natural rubber body stock and vulcanized. After aging the cord is pulled out of the rubber bar, and it contains large pieces of rubber adhering to a substantial portion of its surface.

Example 36

The procedure of Example 31 is repeated except that in this example the rubber body stock is vulcanized into ⅜-inch H specimens using the procedure of ASTM–D2138 as a guide. The specimens are pulled apart on a Scott Tester at 6 inches/minute. The specimens break completely through at a load of 26 to 31.5 lbs., indicating that the cord to rubber bond is stronger than the cord itself.

Example 37

The procedure of Example 31 is again repeated except that the body stock used is a polybutadiene—polyisoprene (1:1) rubber blend. The rubber bar having the azidoformate and resin—latex coated polyester cord embedded therein is vulcanized with sulfur as in Example 26. On pulling the cord from the test bar, it is covered with a heavy sheath of rubber.

Example 38

Example 31 is again repeated, in this instance vulcanizing the styrene-butadiene—natural rubber body stock with dicumyl peroxide rather than sulfur. The cord, on being pulled from the test bar, is completely covered with rubber.

Example 39

An aqueous emulsion of the azidoformate of the triallyl ether of pentaerythritol is prepared by adding 6 parts of a 58% solution of the ammonium salt of a sulfate ester of an alkyl phenoxy poly(ethyleneoxy) ethanol (Alipal CO 436 made by General Analine & Film Corp.) to 600 parts of the azidoformate of the triallyl ether of pentaerythritol, prepared as in Example 2, and adding this combination to 19,400 parts of vigorously stirred water in a blendor. This latter addition is carried out over a period of about five minutes, and the blending is continued for another five minutes after the addition is completed. A stable, white emulsion results.

A section of poly(ethylene terephthalate) tire cord, under 50 grams of tension, is run through a trough containing the above aqueous emulsion of the azidoformate of the triallyl ether of pentaerythritol, with a residence time in the emulsion of 2 to 5 seconds. The azidoformate coated cord is then dried for one minute at 350° F. and dipped slack in the resin—latex dip prepared in Example 25. The coated cord, under 25 grams tension, is then baked for five minutes at 350° F. and is thereafter protected from light and air. A piece of this cord is embedded in a bar of styrene-butadiene—natural rubber body stock and the bar is vulcanized with sulfur for one hour at 307° F. and 2000 lbs. ram pressure. After aging the bar overnight at room temperature, attempts to pull the cord out of the rubber bar result in severe rubber to rubber failure, with large amounts of rubber adhering to the cord.

Example 40

Poly(ethylene terephthalate) tire cord, 840 denier and 2 ply, under about 100 grams of tension is passed through a trough containing a 5% solids aqueous emulsion of the triallyl ether of pentaerythritol of Example 2 (prepared as in Example 39), next through a 430° F. oven for 18 seconds and then to a wind-up spool.

A section of the treated cord is dipped in the resin—latex dip prepared in Example 25, and, after excess dip is shaken from the cord, is cured on tension bars for one minute at 440° F. The coated cord is then vulcanized with rubber in the form of ⅜ inch H-specimens and tested according to the procedure of ASTM D–2138–62T. An average (3 test specimens) of 32 pounds is required to overcome the cord—rubber adhesion.

Another section of the treated cord is dipped, cured and evaluated as above except that the dip is a latex (20% solids) of a carboxylated styrene containing rubber (Firestone Rubber Co., SR–5033) and the curing temperature is 435° F. An average (3 test specimens) of 29 pounds is required to overcome the cord—rubber adhesion.

Example 41

Polypropylene tire cord, 840/140–2 ply, is passed under 150 grams of tension through 5% solids aqueous emulsion of the triallyl ether of pentaerythritol of Example 2 (prepared as in Example 39), is cured for two minutes in a 300° F. forced draft oven and then is packaged on a spool. A three-foot section of the cord, after preheating for two minutes at 300° F. is next dipped slack in the resin—latex dip prepared in Example 25, and then baked for five minutes at 300° F. on tension bars. The coated cord is vulcanized with rubber in the form of H-specimens and tested in accordance with procedure ASTM D–2138–62T. Twelve pounds is required to destroy the cord—rubber adhesion of this example whereas 4–6 pounds is required for a control prepared in the same manner except that the cord is not treated with the azidoformate emulsion.

What I claim and desire to protect by Letters Patent is:

1. A process for preparing synthetic fiber tire cord having good adhesion to vulcanized rubber, comprising: coating the surface of said tire cord with a coating composition comprising an inert liquid diluent and at least one azidoformate selected from the group consisting of (1) 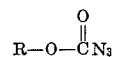

where R is selected from the group consisting of alkenyl, cycloalkenyl, alkenylaryl, and alkenylcycloalkyl radicals containing 2 to 12 carbon atoms;

(2) 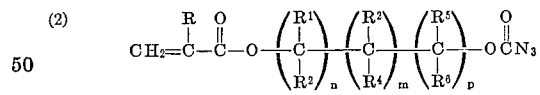

where R is selected from the group consisting of hydrogen and methyl; $R^1$, $R^2$, $R^3$, $R^4$, $R^5$, and $R^6$ are selected from the group consisting of hydrogen and alkyl groups containing 1 to 4 carbon atoms; $n$, $m$, and $p$ are 0 to 6; and the sum of $n$, $m$, and $p$ is 2 to 6;

(3) 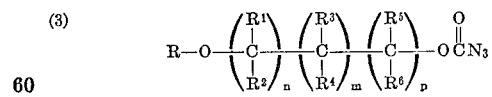

where R is selected from the group consisting of alkenyl radicals containing 2 to 4 carbon atoms and alkenoyl radicals containing 2 to 18 carbon atoms; $R^1$, $R^2$, $R^3$, $R^4$, $R^5$, and $R^6$ are selected from the group consisting of hydrogen, alkyl, methylol;

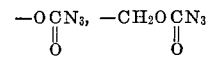

and —CH$_2$O—Y where Y is selected from the group consisting of alkanoyl and alkenoyl radicals containing 3 to 18 carbon atoms; and $n$, $m$, and $p$ are 0 to 6 and the sum of $n$, $m$, and $p$ is 2 to 6;

(4) 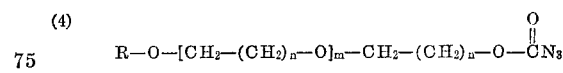

where R is an alkenyl radical containing 2 to 4 carbon atoms, n is 1 to 2, and m is a number which is at least 1;

(5) the monoazidoformate of 2-vinyl-5,5-bis(hydroxymethyl)-1,3-dioxane, the monoazidoformate of the allyl ether of butenediol, the trisazidoformate of dipentaerythritol, the trisazidoformate of dipentaerythritol tritungate, the trisazidoformate of the monoallyl ether of dipentaerythritol, the trisazidoformate of the diallyl ether of dipentaerythritol, the trisazidoformate of the triallyl ether of dipentaerythritol, the tetrakisazidoformate of the monoallyl ether of dipentaerythritol, the tetrakisazidoformate of the diallyl ether of dipentaerythritol, the pentakisazidoformate of the monoallyl ether of dipentaerythritol, the polyazidoformates of the vinyl ethers of mannitol or the polyazidoformates of the allyl ethers of mannitol; and (6) a polymer of at least one of the azidoformates defined by (1) through (5) above; drying said azidoformate on said tire cord surface; applying a second coating to said tire cord surface, superimposed upon said azidoformate coating, said second coating comprising a mixture of a phenol—aldehyde resin and a rubber latex, said latex comprising an aqueous dispersion of a vinyl aryl monomer—diene monomer—vinyl pyridine monomer terpolymer and drying said second coating on said azidoformate-coated tire cord surface.

2. The process of claim 1 wherein the synthetic fiber is selected from the group consisting of polyester, polyolefin, polyamide and rayon fibers.

3. The process of claim 1 wherein the synthetic fiber is of poly(ethylene terephthalate).

4. The process of claim 1 wherein said azidoformate is selected from the group consisting of the azidoformate of the triallyl ether of pentaerythritol, the monoazidoformate of hydroxyethyl methacrylate, oleyl azidoformate, the trisazidoformate of dipentaerythritol tritungate and the monoazidoformate of diethylene glycol monovinyl ether.

5. The process of claim 1 wherein said resin is a copolymer of resorcinal and formaldehyde and said latex is a styrene—butadiene—vinyl pyridine terpolymer.

6. A synthetic fiber tire cord having adhered to its surface a coating of at least one azidoformate selected from the group consisting of

1)

where R is selected from the group consisting of alkenyl, cycloalkenyl, alkenylaryl, and alkenylcycloalkyl radicals containing 2 to 12 carbon atoms;

(2)

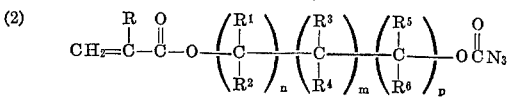

where R is selected from the group consisting of hydrogen and methyl; $R^1$, $R^2$, $R^3$, $R^4$, $R^5$, and $R^6$ are selected from the group consisting of hydrogen and alkyl groups containing 1 to 4 carbon atoms; $n$, $m$, and $p$ are 0 to 6; and the sum of $n$, $m$, and $p$ is 2 to 6;

(3)

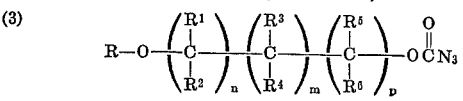

where R is selcted from the group consisting of alkenyl radicals containing 2 to 4 carbon atoms and alkenoyl radicals containing 2 to 18 carbon atoms; $R^1$, $R^2$, $R^3$, $R^4$, $R^5$, and $R^6$ are selected from the group consisting of hydrogen, alkyl, methylol,

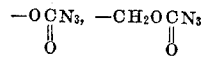

and —CH$_2$O—Y where Y is selected from the group consisting of alkanoyl and alkenoyl radicals containing 3 to 18 carbon atoms; and $n$, $m$, and $p$ are 0 to 6 and the sum of $n$, $m$, and $p$ is 2 to 6;

(4)

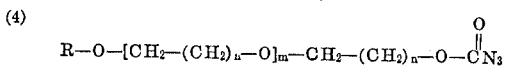

where R is an alkenyl radical containing 2 to 4 carbon atoms, n is 1 to 2, and m is a number which is at least 1;

(5) the monoazidoformate of 2-vinyl-5,5-bis(hydroxymethyl)-1,3-dioxane, the monoazidoformate of the allyl ether of butenediol, the trisazidoformate of dipentaerythritol tritungate, the trisazidoformate of the monoallyl ether of dipentaerythritol, the trisazidoformate of the diallyl ether of dipentaerythritol, the trisazidoformate of the triallyl ether of dipentaerythritol, the tetrakisazidoformate of the monoallyl ether of dipentaerythritol, the tetrakisazidoformate of the diallyl ether of dipentaerythritol, the pentakisazidoformate of the monoallyl ether of dipentaerythritol, the polyazidoformates of the vinyl ethers of mannitol or the polyazidoformates of the allyl ethers of mannitol; and (6) a polymer of at least one of the azidoformates defined by (1) through (5) above.

7. The product of claim 6 wherein the synthetic fiber is selected from the group consisting of polyester, polyolefin, polyamide and rayon fibers.

8. The product of claim 6 wherein said synthetic fiber is of poly(ethylene terephthalate).

9. The product of claim 6 wherein said aphidoformate is selected from the group consisting of the azidoformate of the triallyl ether of pentaerythritol, the monoazidoformate of hydroxyethyl methacrylate, oleyl azidoformate, the trisazidoformate of dipentaerythritol tritungate and the monoazidoformate of diethylene glycol monovinyl ether.

10. The product of claim 6 wherein said azidoformate-coated tire cord has a second coating adhered to its surface, superimposed upon said azidoformate coating, said second coating comprising a mixture of a phenol—aldehyde resin and a rubber latex, said latex comprising a terpolymer of a vinyl aryl monomer, a diene monomer and a vinyl pyridine monomer.

11. The product of claim 10 wherein said resin is a resorcinol—formaldehyde copolymer, and said latex is a styrene—butadiene—vinyl pyridine terpolymer.

12. The product of claim 10 wherein said synthetic fiber is of poly(ethylene terephthalate).

References Cited

UNITED STATES PATENTS 3,231,412  1/1966  Pruitt et al.
3,262,482  7/1966  Clifton et al.

WILLIAM D. MARTIN, Primary Examiner.
R. HUSACK, Assistant Examiner.

U.S. Cl. X.R.

117—161, 138.8, 145, 7; 156—110; 8—115.6